(12) United States Patent
Kumar et al.

(10) Patent No.: US 9,829,100 B2
(45) Date of Patent: Nov. 28, 2017

(54) ELECTRONIC SHIFT SYSTEM FOR AN AUTOMATED MANUAL TRANSMISSION

(71) Applicant: GM Global Technology Operations LLC, Detroit, MI (US)

(72) Inventors: Sudheer Kumar, Bengaluru (IN); Amit Som, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 260 days.

(21) Appl. No.: 14/706,647

(22) Filed: May 7, 2015

(65) Prior Publication Data

US 2016/0327156 A1 Nov. 10, 2016

(51) Int. Cl.
| | |
|---|---|
| *F16H 59/04* | (2006.01) |
| *F16H 61/22* | (2006.01) |
| *F16H 61/24* | (2006.01) |
| F16H 59/68 | (2006.01) |
| F16H 59/02 | (2006.01) |
| F16H 59/10 | (2006.01) |

(52) U.S. Cl.
CPC ......... *F16H 61/24* (2013.01); *F16H 59/0208* (2013.01); *F16H 59/044* (2013.01); *F16H 59/0204* (2013.01); *F16H 59/04* (2013.01); *F16H 59/105* (2013.01); *F16H 61/22* (2013.01); *F16H 2059/0295* (2013.01); *F16H 2059/047* (2013.01); *F16H 2059/6807* (2013.01); *F16H 2061/223* (2013.01); *F16H 2061/242* (2013.01)

(58) Field of Classification Search
None
See application file for complete search history.

(56) References Cited

U.S. PATENT DOCUMENTS

| | | | | |
|---|---|---|---|---|
| 4,916,966 A | * | 4/1990 | Weishaupt | B60K 20/02 403/114 |
| 4,926,172 A | * | 5/1990 | Gorsek | F16H 59/044 200/5 A |
| 7,070,538 B2 | | 7/2006 | Babcock | |
| 8,826,758 B2 | | 9/2014 | Wittkopp | |
| 2013/0179115 A1 | * | 7/2013 | Friedrich | F16H 59/70 702/150 |
| 2014/0373661 A1 | * | 12/2014 | Benson | F16H 61/18 74/473.21 |
| 2015/0066316 A1 | * | 3/2015 | Fujii | F16H 61/0213 701/51 |

* cited by examiner

*Primary Examiner* — Robert A Siconolfi
*Assistant Examiner* — Ryan Dodd

(57) ABSTRACT

An electronic shift system for an automated manual transmission includes a shift lever moveable between at least a neutral position and a first gear position, a clutch pedal, a biasing member connected to the shift lever that biases the shift lever to the neutral position, and a grip system configured to selectively immobilize the shift lever in the first gear position when the clutch pedal is released. An electrical circuit communicates a position of the shift lever to a control module. The control module commands the automated manual transmission to achieve the gear ratio (forward or reverse) corresponding to the first gear position when the shift lever is in the first gear position.

15 Claims, 4 Drawing Sheets

ELECTRONIC SHIFT SYSTEM FOR AN AUTOMATED MANUAL TRANSMISSION

FIELD

The invention relates generally to electronic shift systems for automated manual transmissions, and more particularly to an electronic shift system having dampers, detents, and a grip mechanism to create the shift feel of a manual transmission.

BACKGROUND

The statements in this section merely provide background information related to the present disclosure and may or may not constitute prior art.

Automated manual transmissions (AMT's) are a hybrid transmission, combining some of the characteristics of the manual transmission and the automatic transmission. AMT's, generally speaking, have increased driving comfort and aid in reducing fuel consumption and exhaust emissions. The shift operation of an AMT is similar to that of a manual transmission where a driver engages a shift lever, and the shift lever is mechanically connected to an internal selector by a shift cable. The internal selector communicates with a controller that communicates with electronically controlled clutch and shift forks. Actual gear ratio changes are commanded by the controller based on various factors, including the gear ratio commanded by the driver via the shift lever.

However, while these systems are useful for their intended purpose, it is possible that the shift cable can rattle, thus making unwanted noise in the motor vehicle or creating undesirable feel through the shift lever. Thus, there is need in the art for an AMT having a shift system having the shift feel and characteristics of a manual transmission while eliminating shift cable rattle.

SUMMARY

An electronic shift system for an automated manual transmission is provided. The electronic shift system includes a shift lever moveable between at least a neutral position and a first gear position, a clutch pedal, a biasing member connected to the shift lever that biases the shift lever to the neutral position, and a grip system configured to selectively immobilize the shift lever in the first gear position when the clutch pedal is released. An electrical circuit includes a switch connected to the shift lever, a power source connected to the switch, a first contact disposed at the first gear position, and a first resistor associated with the first contact. A control module is in communication with the electrical circuit and the clutch pedal. A user can select a gear position using the shift lever. The shift lever closes the switch with the first contact when in the first gear position and the first resistor generates a first voltage corresponding to the first gear position that is communicated to the control module. The control module then commands the gear ratio (forward or reverse) corresponding to the first gear position.

In one aspect of the electronic shift system, a damper connected to the biasing member.

In another aspect of the electronic shift system, the grip system includes a first grip member and a second grip member and the shift lever is disposed between the first and second grip members.

In another aspect of the electronic shift system, the grip system further includes a first rack connected to the first grip member, a second rack connected to the second grip member, and a pinion in mesh with both the first rack and the second rack. Rotation of the pinion selectively translates the first rack, the second rack, the first grip member and the second grip member towards the shift lever and away from the shift lever.

In another aspect of the electronic shift system, a motor is connected to the pinion and is in communication with the control module, wherein the control module commands the motor to rotate the pinion to translate the first and second grip members to grip the shift lever when the shift lever is in the first gear position and the clutch pedal is released.

In another aspect of the electronic shift system, a shift cover defines a shift pattern and the shift lever is extended through the shift pattern of the shift cover.

In another aspect of the electronic shift system, a detent mechanism is disposed between the neutral position and the first gear position of the shift lever. The detent mechanism holds the shift lever in the first gear position against the bias of the biasing member.

In another aspect of the electronic shift system, the detent mechanism includes a first ball and spring opposite a second ball and spring to hold the shift lever in the first gear position.

In another aspect of the electronic shift system, the detent mechanism is connected to the shift cover.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
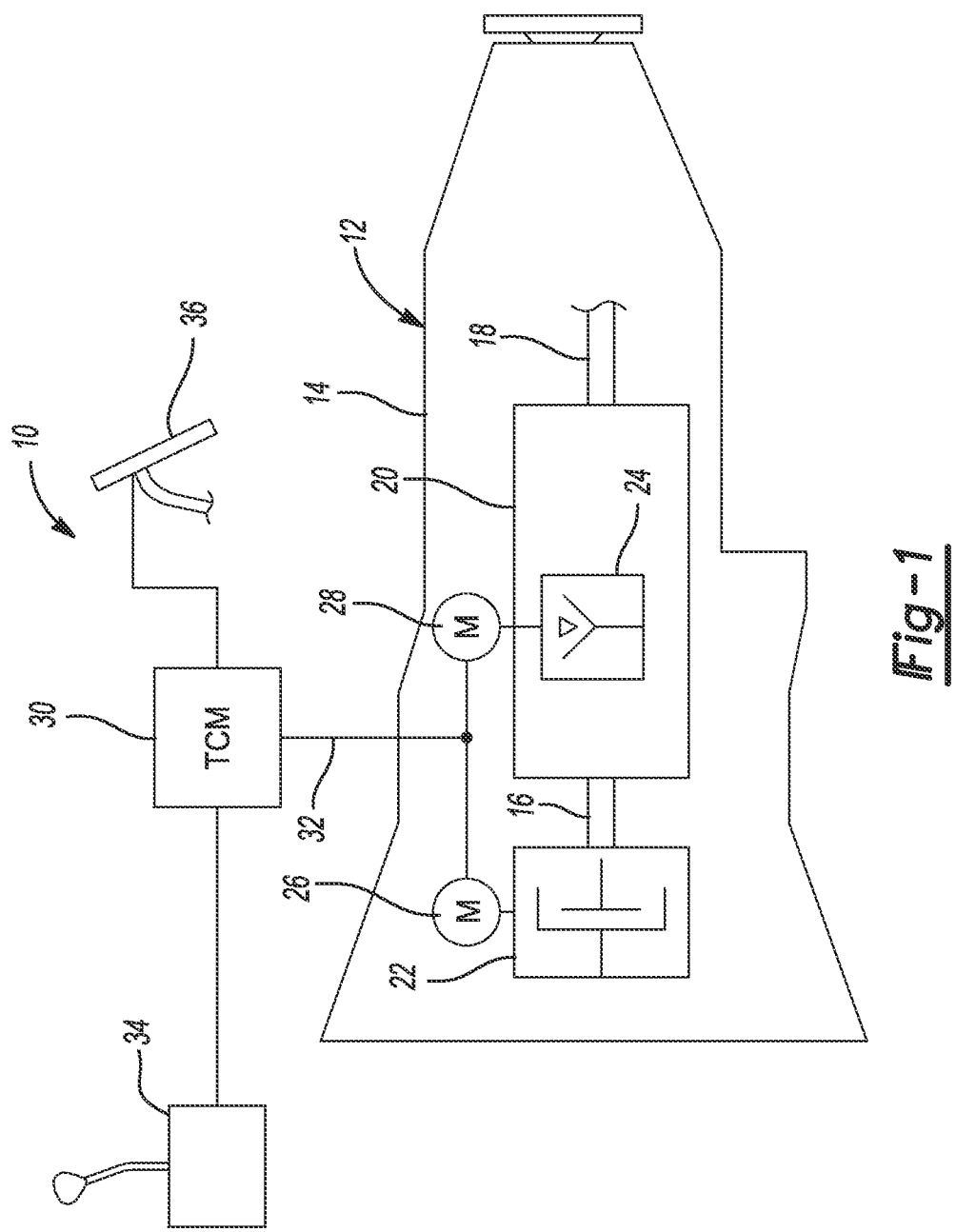
FIG. 1 is a schematic diagram of an automated manual transmission having an electronic shift system according to the principles of the present invention.

With reference to FIG. 1, an electronic shift system, indicated by reference number 10, is illustrated with an exemplary automated manual transmission 12 for use in a motor vehicle. It should be appreciated that while the automated manual transmission 12 has been schematically illustrated as a rear wheel drive transmission, the automated manual transmission 12 may be a front wheel drive transmission without departing from the scope of the present invention. The automated manual transmission 12 generally includes a typically cast, metal housing 14 which encloses and protects the various components of the transmission 12. The housing 14 includes a variety of apertures, passageways, shoulders and flanges which position and support these components. Generally speaking, the transmission 12 includes a transmission input shaft 16, a transmission output shaft 18, and a gear and clutch arrangement 20 disposed there between. The transmission input shaft 16 is functionally interconnected with an engine (not shown) through a starting device 22 such as dry or wet dual clutch. The clutch 22 is engageable to selectively connect the engine to the transmission 12. The transmission output shaft 18 is preferably connected with a final drive unit (not shown) which includes, for example, a prop shaft, differential assembly, and drive axles connected to wheels. The transmission input shaft 16 is coupled to and provides drive torque to the gear and clutch arrangement 20.

The gear and clutch arrangement 20 includes at least one dog clutch or synchronizer 24 that synchronizes one or more gear sets (not shown) with one or more shafts (not shown). The gear sets may include co-planar, intermeshing gears while the shafts may include lay shafts or countershafts, sleeve and center shafts, reverse or idle shafts, or combinations thereof. The synchronizer 24 is selectively engageable to initiate at least one of a plurality of gear or speed ratios by selectively coupling individual gears within the plurality of gear sets to the plurality of shafts. It should be appreciated that the specific arrangement and number of the gear sets, synchronizers 24, and shafts within the transmission 12 may vary without departing from the scope of the present invention. It should also be appreciated that the transmission 12 may be a planetary gear set transmission with a torque converter, planetary gear sets, clutches, and brakes without departing from the scope of the present invention.

The clutch 22 is actuated or engaged by a first electric motor 26. Likewise, the synchronizer 24 is actuated by a second electric motor 28. The electric motors 26, 28 are controlled by a transmission control module (TCM) 30. The TCM 30 is a non-generalized, electronic control device having a preprogrammed digital computer or processor, control logic or circuits, memory used to store data, and at least one I/O peripheral. The control logic includes or enables a plurality of logic routines for monitoring, manipulating, and generating data and control signals. Controls signals are communicated through a bus network such as a controller area network 32 to the first and second electric motors 26, 28, and to various other components within the motor vehicle. It should be appreciated that the TCM 30 may be other types of control modules used to electrically control the operation of the motor vehicle, for example an engine control module, an electronic brake control module, a body control module, etc.

The electronic shift system 10 is used to select individual gear ratios within the transmission 12 and includes a shift selection unit 34 and a clutch pedal 36 each in electrical communication with the TCM 30 via the CAN 32.

Figure 2:
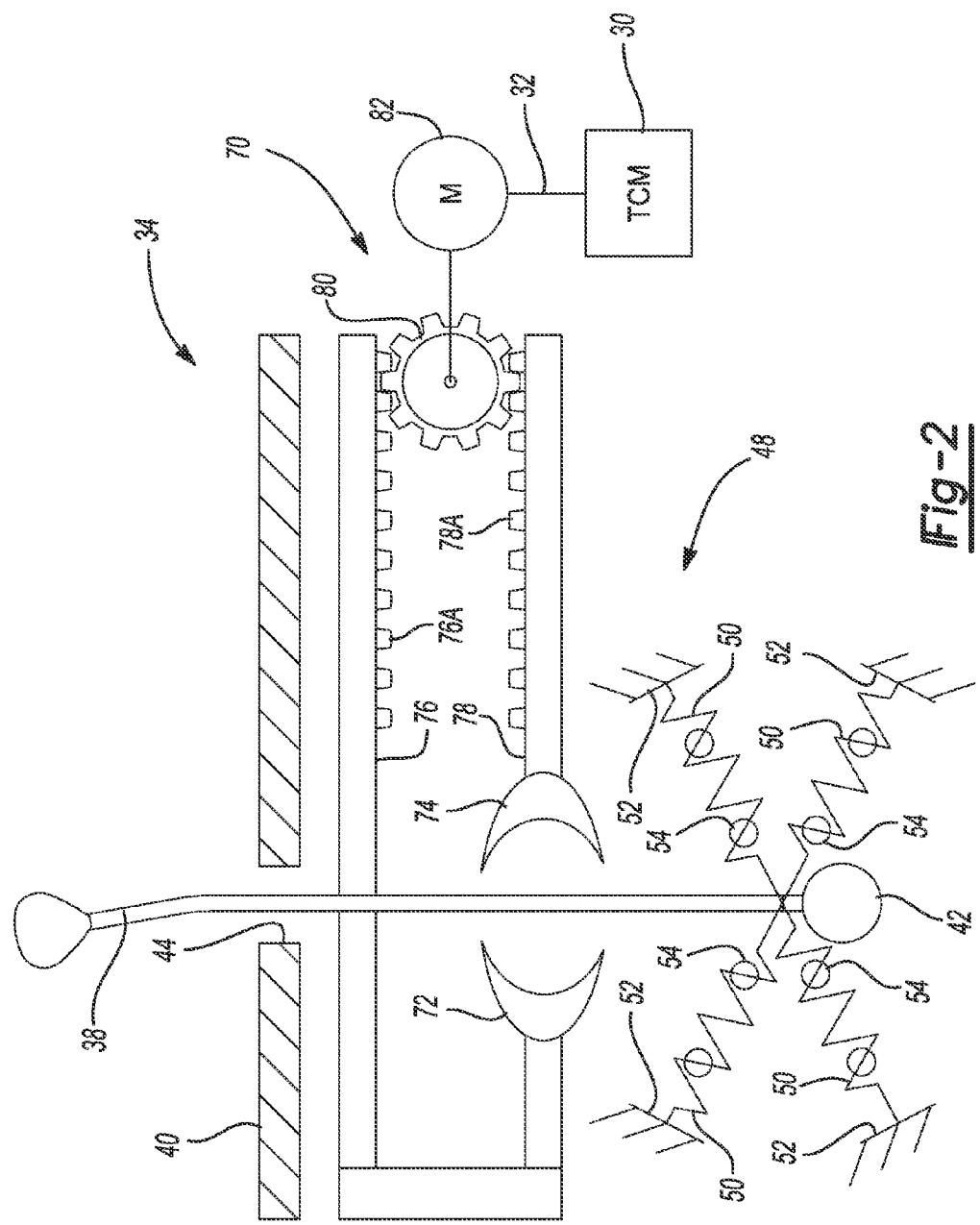
FIG. 2 is a schematic, cross-sectional diagram of the electronic shift system.
Figure 3:
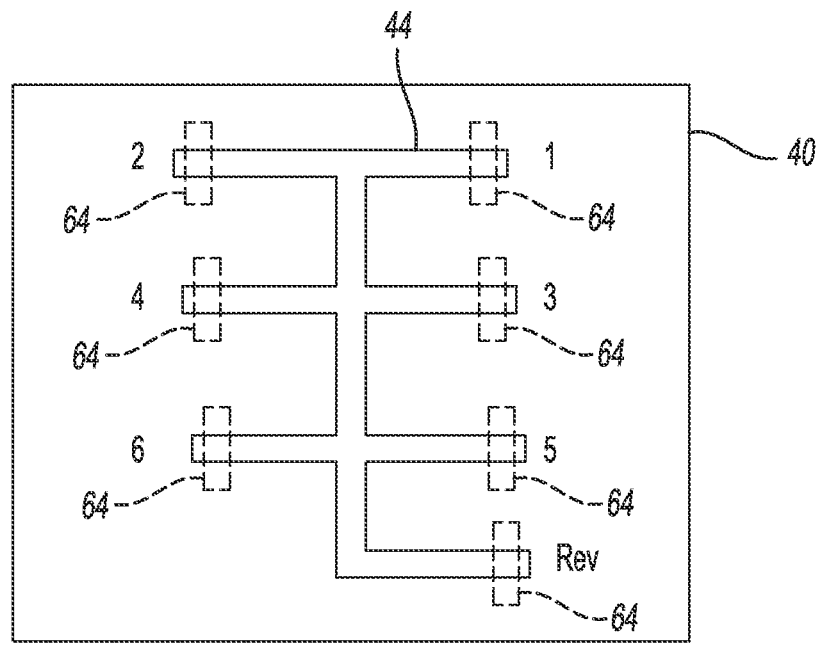
FIG. 3 is a top view of a shift cover used in the electronic shift system.

Turning now to FIGS. 2 and 3, the shift selection unit 34 includes a shift lever 38 that extends out through a shift cover 40. The shift lever 38 pivots about a ball and socket joint 42 and may rotate as well as move laterally within a shift pattern 44 formed in the shift cover 40 (see FIG. 3). In the example provided, the shift pattern 44 is illustrated as having six forward speed or gear ratios and one reverse gear ratio, though it should be appreciated that any number of forward and reverse gear ratios may be employed. The shift lever 38 has a neutral position relative to the shift pattern 44 which does not correspond to any forward or reverse gear ratio. A damping system 48 is connected to the shift lever 38 to bias the shift lever 38 to the neutral position. The damping system 48 includes a plurality of biasing members or springs 50 connected to the shift lever 38 and to a fixed member 52, such as a housing. Rubber elements or dampers 54 are disposed on each of the springs 50 to dampen oscillation and vibrations on the springs 50. The springs 50 bias the shift lever 38 to the neutral position and are tuned to require a desired shift force that provides a shift feel equivalent to that of a conventional shift lever in a manual transmission.

Figure 4:
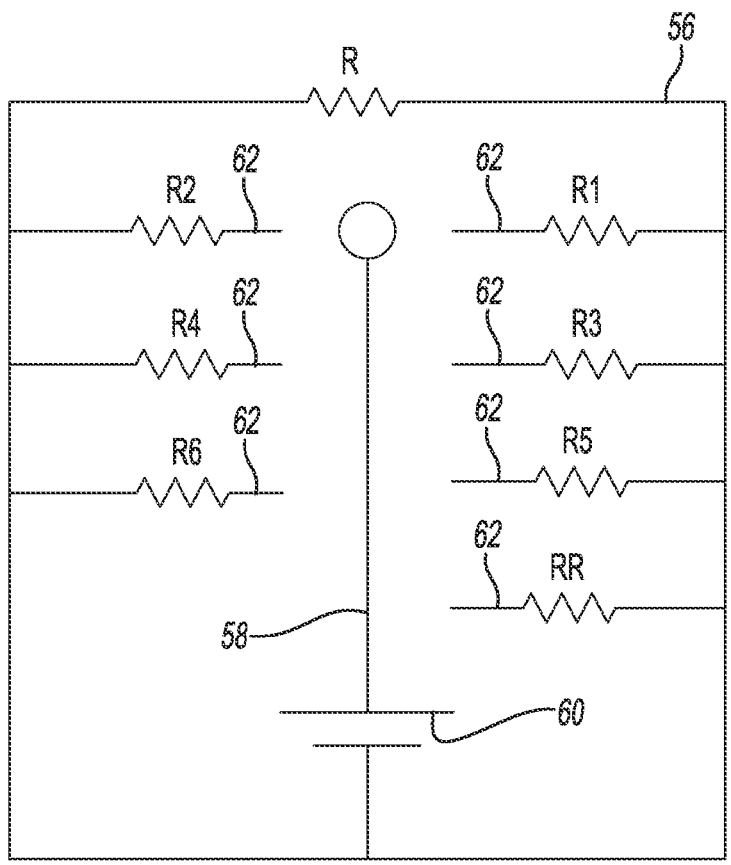
FIG. 4 is an electrical diagram of a shift detection system used in the electronic shift system.

With reference to FIG. 4 and continued reference to FIG. 3, a driver of the motor vehicle selects a gear ratio by moving the shift lever 38 into one of the gear positions shown in the shift pattern 44. When the shift lever 38 moves into one of these gear positions, an electrical connection is made between the shift lever 38 and an electrical circuit 56. For example, a switch element 58 associated with the shift lever 38 is connected to a battery or power source 60. The switch element 58 contacts one of a plurality of switch contacts 62 when the shift lever 38 is moved to a gear position within the shift pattern 44. Each of the switch contacts 62 is connected to a resistor R1-R6 and RR corresponding to gear positions first through sixth and reverse, respectively. Each of the resistors R1-R6 and RR have a unique resistance value. Thus, a different voltage is generated across each of the resistors R1-R6 and RR corresponding to one of the gear positions. The electrical circuit 56 is in communication with the TCM 30. The TCM 30 determines the selected gear ratio by detecting the voltage generated across each of the resistors R1-R6 and RR. The TCM 30 then commands the desired gear ratio by controlling the first and second motors 26, 28 (FIG. 1) to engage the dual clutch 22 and the synchronizer 24. It should be appreciated that the electrical circuit 56 may be an electronic circuit with decision or processing components without departing from the scope of the present invention.

Figure 5:
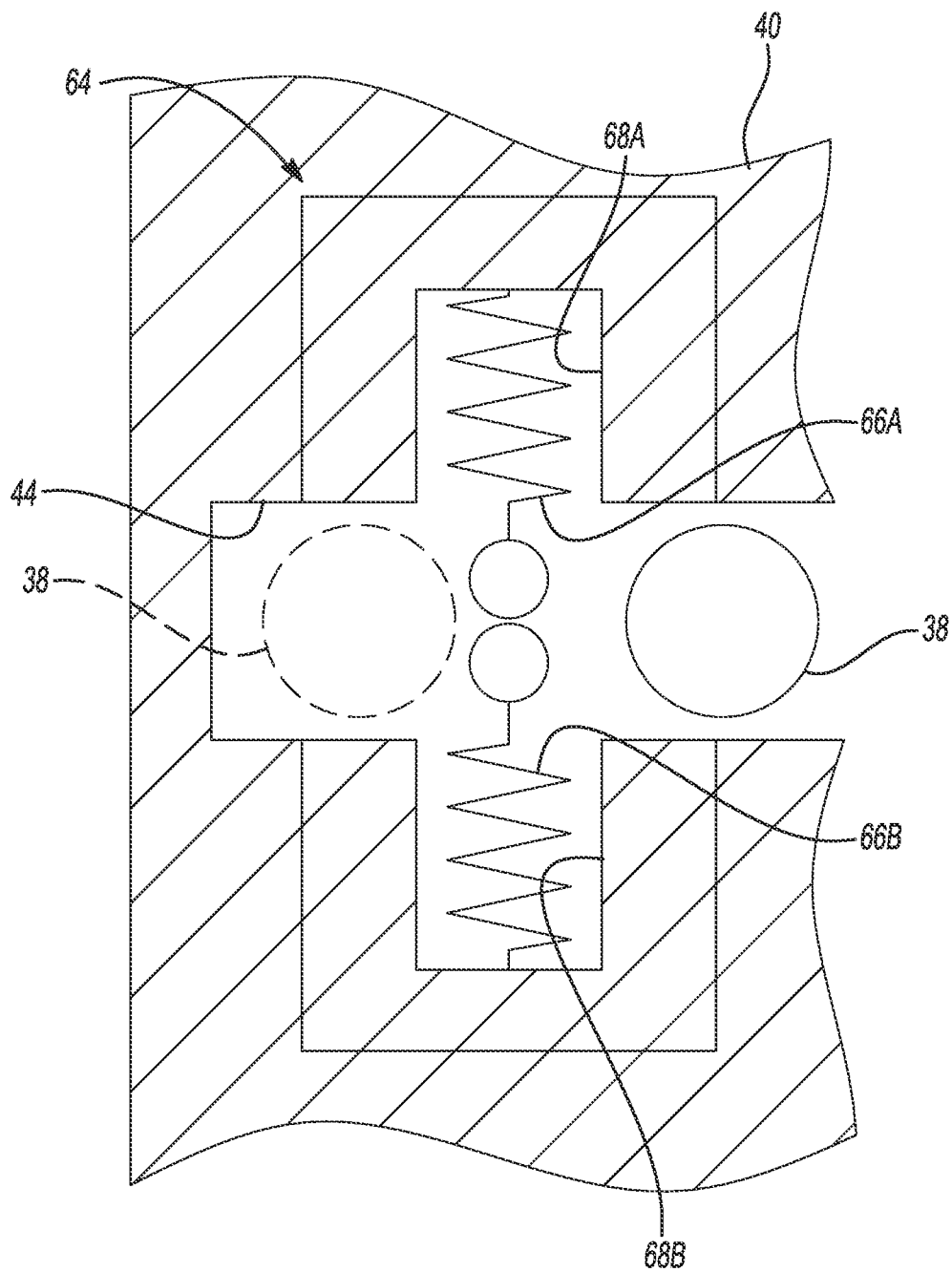
FIG. 5 is a schematic, cross-sectional diagram of a detent system used in the electronic shift system.

Turning now to FIG. 5 and with continued reference to FIGS. 3 and 4, in order to ensure a solid connection between the switch element 58 and the switch contact 62, each gear position in the shift cover 44 includes a detent assembly 64. The detent assembly 64 includes two opposing ball and spring mechanisms 66A and 66B. The ball and spring mechanisms are each disposed within respective channels 68A and 68B formed in the shift cover 44. Alternatively, the detent assembly 64 may be disposed separate from the shift cover 44. The ball and spring mechanisms 66A, 66B are biased towards one another. When the shift lever 38 is moved to a gear position, shown by dashed lines in FIG. 5, the shift lever 38 moves the ball and spring mechanisms 66A, 66B away from each other. Once in the gear position, the ball and spring mechanism 66A, 66B are free to close. However, the damper system 48 still exerts a force on the shift lever 38 toward the neutral position. The ball and spring mechanisms 66A, 66B oppose the force of the damper system 48 and keep the shift lever 38 in the selected gear position.

Returning to FIG. 2 and with continued reference to FIG. 1, the electronic shift system 10 further includes a grip mechanism 70 used to keep the shift lever 38 in a gear position and to prevent waggle or movement of the shift lever 38. The grip mechanism 70 includes a first grip 72 opposite a second grip 74. Each of the grips 72, 74 is configured to mechanically grip the shift lever 38 between the grips 72, 74. The first grip 72 is connected to a first rack 76 having a plurality of gear teeth 76A. The second grip 74 is connected to a second rack 78 having a plurality of gear teeth 78A. A pinion 80 is disposed between the first and second racks 76, 78 and is in mesh with each. The pinion 80 is rotatable by a third electric motor 82. The third electric motor 82 is in communication with the TCM 30. The TCM 30 commands the third electric motor 82 to rotate clockwise to close the grips 72, 74 to grip the shift lever 38 when the clutch pedal 36 is released, thus keeping the shift lever 38 from moving. When the TCM 30 detects that the clutch pedal 36 has been depressed, the TCM 30 commands the third electric motor 82 to rotate the pinion 80 counterclockwise to open the grips 72, 74 and release the shift lever 38.

The description of the invention is merely exemplary in nature and variations that do not depart from the gist of the invention are intended to be within the scope of the invention. Such variations are not to be regarded as a departure from the spirit and scope of the invention.

The following is claimed:

1. An electronic shift system for an automated manual transmission, the electronic shift system comprising:
    a shift lever moveable between at least a neutral position and a first gear position;
    a clutch pedal;
    a biasing member connected to the shift lever that biases the shift lever to the neutral position;
    a grip system configured to selectively immobilize the shift lever in the first gear position, wherein the grip system includes a first grip member and a second grip member and the shift lever is disposed between the first and second grip members;
    an electrical circuit having a switch connected to the shift lever, a power source connected to the switch, a first contact disposed at the first gear position, and a first resistor associated with the first contact;
    a control module in electronic communication with the electrical circuit and the clutch pedal, and
    wherein the shift lever closes the switch with the first contact when in the first gear position and the first resistor generates a first voltage corresponding to the first gear position that is communicated to the control module.

2. The electronic shift system of claim 1 further comprising a damper connected to the biasing member.

3. The electronic shift system of claim 1 wherein the grip system further includes a first rack connected to the first grip member, a second rack connected to the second grip member, and a pinion in mesh with both the first rack and the second rack, and wherein rotation of the pinion selectively translates the first rack, the second rack, the first grip member and the second grip member towards the shift lever and away from the shift lever.

4. The electronic shift system of claim 3 further comprising a motor connected to the pinion and in communication with the control module, wherein the control module commands the motor to rotate the pinion to translate the first and second grip members to grip the shift lever when the shift lever is in the first gear position and the clutch pedal is released.

5. The electronic shift system of claim 1 further comprising a shift cover defining a shift pattern, and wherein the shift lever is extended through the shift pattern of the shift cover.

6. The electronic shift system of claim 5 further comprising a detent mechanism disposed between the neutral position and the first gear position of the shift lever.

7. The electronic shift system of claim 6 wherein the detent mechanism includes a first ball and spring opposite a second ball and spring to hold the shift lever in the first gear position.

8. The electronic shift system of claim 7 wherein the detent mechanism is connected to the shift cover.

9. A system comprising:
    a transmission having a first motor and a second motor for controlling an output gear ratio;
    an electronic shift system for selecting the output gear ratio including:
        a shift lever moveable between at least a neutral position and a first gear position;
        a biasing member connected to the shift lever that biases the shift lever to the neutral position;
        a grip system configured to selectively immobilize the shift lever in the first gear position; and
        an electrical circuit having a switch connected to the shift lever, a power source connected to the switch, a first contact disposed at the first gear position, and a first resistor associated with the first contact;
        a shift cover defining a shift pattern, and wherein the shift lever is extended through the shift pattern of the shift cover;
        a detent mechanism disposed between the neutral position and the first gear position of the shift lever, wherein the detent mechanism includes a first ball and spring opposite a second ball and spring to hold the shift lever in the first gear position;
    a control module in communication with the electrical circuit, and
    wherein the shift lever closes the switch with the first contact when in the first gear position and the first resistor generates a first voltage corresponding to the first gear position that is communicated to the control module, and wherein the control module commands the first motor and the second motor to set the output gear ratio to a gear ratio associated with the first gear position.

10. The system of claim 9 further comprising a clutch pedal and wherein the control module is configured to determine a position of the clutch pedal.

11. The electronic shift system of claim 10 wherein the grip system includes a first grip member and a second grip member, and wherein the shift lever is disposed between the first and second grip members.

12. The electronic shift system of claim 11 wherein the grip system further includes a first rack connected to the first grip member, a second rack connected to the second grip member, and a pinion in mesh with both the first rack and the second rack, and wherein rotation of the pinion selectively translates the first rack, the second rack, the first grip member and the second grip member towards the shift lever and away from the shift lever.

13. The electronic shift system of claim 12 further comprising a third motor connected to the pinion and in communication with the control module, wherein the control module commands the third motor to rotate the pinion to translate the first and second grip members to grip the shift lever when the shift lever is in the first gear position and the clutch pedal is released, and wherein the control module commands the third motor to rotate the pinion to translate the first and second grip members to release the shift lever when the clutch pedal is depressed.

14. The electronic shift system of claim 9, wherein the detent mechanism is connected to the shift cover.

15. A system comprising:
    a transmission having a first motor and a second motor for controlling an output gear ratio;
    an electronic shift system for selecting the output gear ratio including:
        a clutch pedal;
        a shift lever moveable between at least a neutral position and a first gear position;
        a biasing member connected to the shift lever that biases the shift lever to the neutral position;

a grip system configured to selectively immobilize the shift lever in the first gear position, the grip system having a first grip member and a second grip member connected to a rack and pinion actuated by a third motor, wherein the shift lever is disposed between the first and second grip members;

a detent mechanism disposed between the neutral position and the first gear position of the shift lever for holding the shift lever in the first gear position against the bias of the biasing member; and an electrical circuit connected to the shift lever for sensing a position of the shift lever;

a control module in communication with the electronic circuit the first motor, the second motor, the third motor, and the clutch pedal, and wherein the control module commands the first motor and the second motor to set the output gear ratio to a gear ratio associated with the first gear position when the shift lever is in the first gear position and commands the grip system to grip the shift lever when the shift lever is in the first gear position and the clutch pedal is not depressed.

* * * * *